(No Model.)
J. D. MILLER.
FRUIT OR VEGETABLE CUTTER.
No. 497,675.                    Patented May 16, 1893.
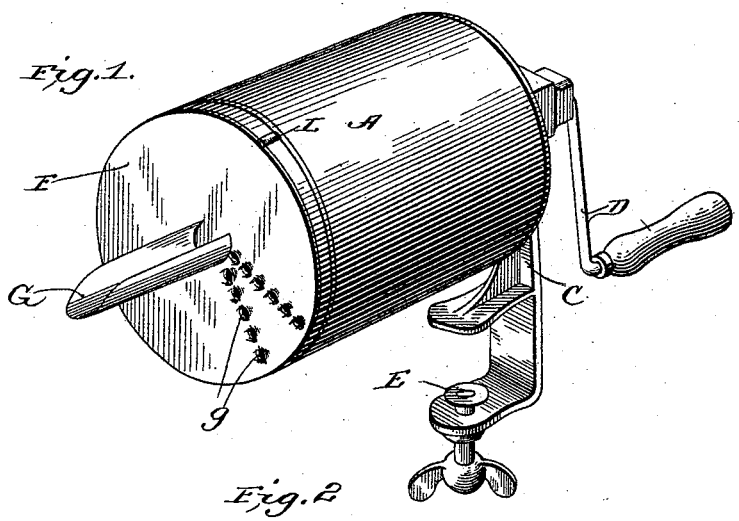
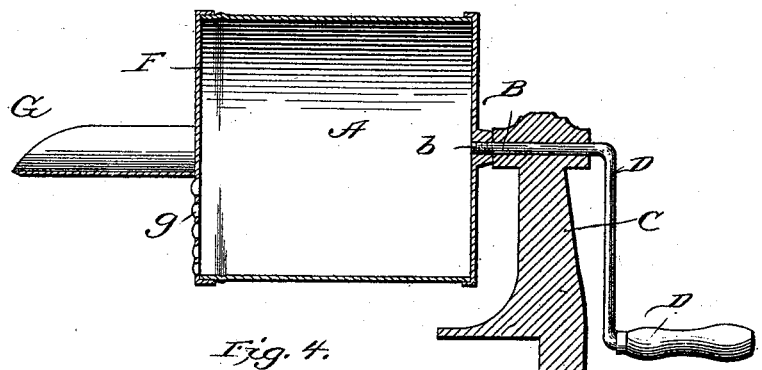
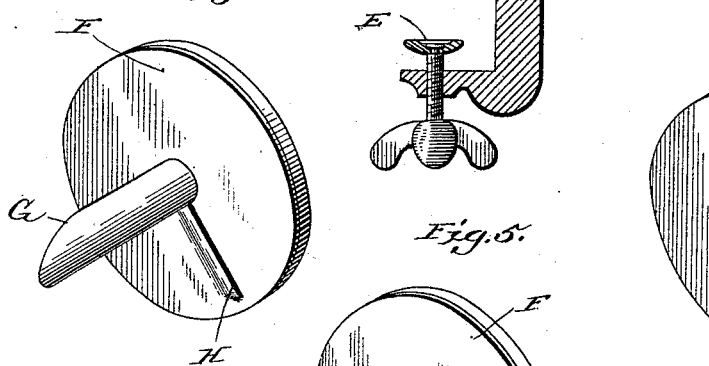
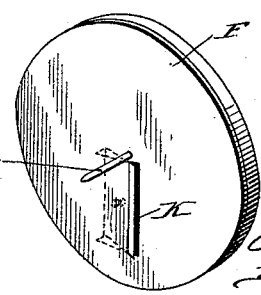
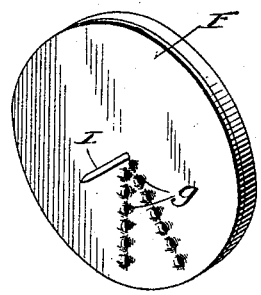
Witnesses:
Harry S. Rohrer
Alex Stewart
Inventor
John D. Miller
By Church & Church
His Attorneys

United States Patent Office.

JOHN D. MILLER, OF RIVERDALE, MARYLAND.

FRUIT OR VEGETABLE CUTTER.

SPECIFICATION forming part of Letters Patent No. 497,675, dated May 16, 1893.

Application filed November 21, 1892. Serial No. 452,726. (No model.)

*To all whom it may concern:*

Be it known that I, JOHN D. MILLER, of Riverdale, Prince George's county, Maryland, have invented certain new and useful Improvements in Domestic Fruit and Vegetable Cutters; and I do hereby declare the following to be a full, clear, and exact description of the same, reference being had to the accompanying drawings, forming a part of this specification, and to the letters of reference marked thereon.

The object of this invention is to provide an extremely cheap and simple device for slicing, cutting or grating fruit, vegetables, &c., essentially adapted for domestic use, a further object being to provide a device of this character in which the sliced or cut material is deposited in a receptacle as it is cut and retained in a compact body whereby all wastage or spattering is obviated.

A further object is to provide a device adapted for a variety of uses, for instance to core and slice apples, to slice onions, potatoes or similar vegetables or to grate or cut such fruit or vegetables into relatively fine shreds adapted for making soup, pies, &c., in which it is desirable that the body of the fruit or vegetable shall be reduced to a fine loose condition.

With these objects in view, the invention may be said to consist broadly in a receptacle journaled in a suitable bearing and provided with a crank handle or suitable means for imparting rotation to the vessel and a removable cover bearing upon or in its face the cutters, graters or comminuters and a center projection for holding the fruit or vegetable while being acted upon.

Further the invention consists in certain novel details of construction and combinations and arrangements of parts all as will be now described and pointed out particularly in the appended claims.

Referring to the accompanying drawings: Figure 1 is a perspective view of a vegetable cutter constructed in accordance with my invention with a cover applied thereto carrying a corer and cutter adapted especially for apples. Fig. 2 is a vertical section through the device. Fig. 3 is a perspective view of one of the interchangeable covers adapted for shredding or comminuting any of the fruits or vegetables mentioned. Fig. 4 is a similar view of an apple corer and slicer. Fig. 5 is a similar view of a slicer adapted especially for cutting onions.

Similar letters of reference in the several figures indicate the same parts.

Referring particularly to Figs. 1 and 2, it will be seen that I have provided a cylindrical receptacle A of tin or other suitable sheet metal, to the center of the bottom of which is attached a shaft B, preferably by means of a screw threaded connection $b$ to facilitate the removal of the receptacle for cleaning purposes. The shaft B passes through a journal bearing in the upper end of a standard C and terminates at the rear end in a crank handle D by which the vessel or receptacle may be rotated as will be readily understood.

The standard C is provided with a clamp base E or other well known device for attaching the standard to the edge of a table or shelf, in order to hold the vessel or receptacle in substantially horizontal position, and at a convenient height for the operator to turn the crank handle with one hand while presenting the fruit or vegetables with the other hand.

For the front end of the receptacle I preferably provide a series of removable and interchangeable covers F each of which is provided with a central projection or centering stud and a radially arranged knife or knives.

As shown in Fig. 1 the centering stud or projection takes the form of a semi-cylindrical apple corer G and the cutter is composed of a double series of small curved lips $g$, formed by cutting and striking up the body of the cover itself with the lips of the rear series arranged in line with the spaces between the lips or cutters of the front series. With this cutter an apple may be cored by presenting the same to the corer and rotating the vessel or receptacle and when the body of the apple is forced down against the flat face of the cover it will be cut into shreds by the double series of small curved cutters and deposited within the receptacle.

Should it be desired to slice the apple instead of shredding the same, the cover shown in Fig. 1 may be removed and that shown in Fig. 4 substituted, the latter having a long radial cutting edge H struck up from the body of the cutter as shown, in lieu of the small curved cutters before described.

In case the fruit or vegetable is not to be cored the centering projection takes the form of a simple pin I, Figs. 3 and 5, and the cutters of course may be of any character.

In Fig. 3 cutters similar in construction to those in Fig. 1 are shown and in Fig. 5 an independent plate K of steel is shown, adapting the device for slicing onions, with which vegetable it is found a somewhat sharper blade is necessary with a wider space or opening in front of it. While I have shown these forms of cutter, I do not wish to be understood as limiting myself to any particular form, inasmuch as it is obvious that any well known form of cutter blade may be substituted in the face of the cover of the vessel, without departing from the spirit of my invention.

The economy and convenience of a cutter constructed as herein shown and described are apparent, for not only can it be made at a cost to place it within reach of any one, but its range of utility is very wide, being adapted for cutting any of the ordinary vegetables and fruits used in the culinary arts.

The vessel is readily removable from its shaft for cleaning or conveying the cut fruit or vegetables and if desired provision may be made for preventing the slipping of the covers on the vessel during the cutting operation by forming a bead or projection L at some point in the peripheries of the said parts as shown in Fig. 1.

Having thus described my invention, what I claim as new is—

1. In a fruit and vegetable cutter, such as described, the combination with the rotary receptacle, of the removable cover therefor, having the cutting knife in its flat face; substantially as described.

2. In a fruit and vegetable cutter, the combination with the receptacle having the shaft centrally secured thereto at one end, and the journal bearing and standard in which said shaft is mounted, of the removable cover fitting on the opposite end of the receptacle having the cutting knife or knives in its flat face; substantially as described.

3. In a fruit and vegetable cutter, the combination with the receptacle having the shaft centrally secured thereto at one end, the crank handle on the rear end of the shaft and the journal bearing and standard in which the said shaft is mounted having the clamping base, of the removable cover fitting on the opposite end of the receptacle and having the cutting knife in its flat face; substantially as described.

4. The combination with the rotary receptacle having the cutting knife or knives in the flat face of the forward end, of the shaft detachably secured to the receptacle at the rear end, the crank handle on the shaft and the journal bearing and standard in which said shaft is mounted; substantially as described.

JOHN D. MILLER.

Witnesses:
ALEX. S. STEUART,
A. M. KELLY.